Patented Sept. 28, 1943

2,330,353

UNITED STATES PATENT OFFICE 2,330,353

MIXTURE OF POLYMERIZED MATERIALS

Donald E. Henderson, Akron, Ohio, assignor to The B. F. Goodrich Company, New York, N. Y., a corporation of New York No Drawing. Application June 20, 1940, Serial No. 341,530

12 Claims. (Cl. 260—42)

A material possessing the extraordinarily great resilience and high tensile strength of rubber but which would remain substantially unaffected by influences which rapidly deteriorate natural rubber such as immersion in gasoline, benzene, mineral or vegetable oils, exposure to sunlight, oxygen or ozone or contact with oxidizing or corrosive chemicals like concentrated sulfuric or nitric acid or bromine, and which would readily be convertible from a plastic workable condition to an elastic non-thermoplastic condition, would be particularly desirable for a multitude of uses and for the construction of articles of many different kinds. The need for such a material has long been recognized by workers in the art and accordingly some progress has already been made toward the attainment of this end.

Synthetic oil-resistant rubber-like materials have heretofore been produced, the most noteworthy example of such a material being a copolymer or inter-copolymer of a butadiene-1,3 hydrocarbon, by which is meant butadiene-1,3 and its hydrocarbon homologs such as isoprene, and an acrylic nitrile such as acrylonitrile or methacrylonitrile. Although synthetic rubber of this type does possess good tensile strength and resilience and is somewhat resistant to swelling by mineral oils, it, nevertheless, is subject to attack by oxidizing acids, halogens and corrosive chemicals and will swell when in contact with a number of solvents such as benzene and other aromatic solvents.

Perhaps the most completely resistant synthetic material known is a highly polymerized vinyl halide such as gamma polyvinyl chloride. A material of this type is resistant to most solvents at ordinary temperatures, withstands oxygen or ozone and is almost completely unattacked by the most destructive and corrosive chemicals, even boiling nitric acid. Polyvinyl halides however are not ordinarily resilient and rubber-like but may be made so by plasticization at elevated temperatures with a non-volatile solvent in the manner outlined by the Semon Patent 1,929,453. The greatest difficulty with the use of this plasticized polyvinyl halide is the fact that the material is thermoplastic and consequently is seldom suitable for use at temperatures above 70° C. due to its tendency to flow. Moreover, solvents slowly leach out the plasticizer from the composition causing a shrinking of the material when in prolonged contact with oily substances. Furthermore, in comparison with rubber or with the butadiene-1,3 acrylic nitrile copolymer the tensile properties obtainable with plasticized polyvinyl halides are low.

I have now discovered that a composition which possesses advantages over both the butadiene-1,3 acrylic nitrile copolymer and plasticized polyvinyl chloride, without the outstanding disadvantages of either, may be prepared by incorporating a highly polymerized vinyl halide with a butadiene-1,3 acrylic nitrile copolymer. The composition is very resistant, yet it is flexible, resilient, non-thermoplastic and vulcanizable. It may be used in a number of applications where neither a butadiene-1,3 acrylic nitrile copolymer nor a plasticized polyvinyl halide alone would be entirely suitable. Moreover, the properties of this new composition are not merely a summation of properties of the two components but unexpected improvements are obtained, as hereinafter shown.

In carrying out this invention use is made of a copolymer of a butadiene-1,3 hydrocarbon and an acrylic nitrile, preferably a copolymer of butadiene-1,3 and acrylonitrile, which may have been prepared by any of the known methods of preparing copolymers, although it has been found that copolymers prepared by emulsion polymerization give best results. The copolymer may contain other materials in small amounts either copolymerized along with the butadiene-1,3 and acrylic nitrile or added after the polymerization. It is desirable that the copolymer be rendered as plastic as is consistent with high ultimate strength by mastication or by any other means before use in this invention. It is also preferred to use a copolymer which contains from about 40 to 70% by weight of butadiene-1,3 and 30 to 60% by weight of acrylonitrile since copolymers of this composition are more compatible with the polyvinyl halide, although copolymers higher in butadiene may be employed.

The other component used in the composition of this invention is a polyvinyl halide preferably polyvinyl chloride or some other polymeric material in which the predominant constituent is a vinyl halide, such as a copolymer of vinyl chloride with a small proportion of vinyl acetate, vinyl cyanide, vinylidene chloride, styrene, methyl methacrylate or the like. The preferred material is the highly polymerized vinyl chloride known as gamma polyvinyl chloride. This material may be in the powdered, finely divided form free from other ingredients or it may be plasticized at an elevated temperature with a non-volatile solvent such as tricresyl phosphate to a resilient gel before use.

The commingling of the copolymer and the polyvinyl chloride may take place on an ordinary rubber mill by simply milling the powdered polyvinyl chloride into the copolymer until a homogeneous mass is obtained. Mixing is facilitated by making use of a warm mill. Vulcanizing and compounding ingredients for the mixture may afterwards be milled in if desired. Another method of mixing is to compound the butadiene-1,3 acrylonitrile copolymer and the polyvinyl chloride separately with suitable plasticizers, softeners, vulcanizing ingredients and the like and then to mix the compounded stocks. Other mixing techniques such as the use of an internal mixer may be employed if desired although either of the above methods gives good results. The composition is finally shaped by extruding, molding, calendering or the like and then vulcanized.

As a specific embodiment of this invention 100 parts of a copolymer made by polymerizing 55% by weight of butadiene-1,3 with 45% by weight of acrylonitrile are broken down to a plastic condition on a mill and 100 parts of powdered gamma polyvinyl chloride are then milled into the copolymer until a homogeneous mass is obtained. The mixture is a tough, strong, resilient, resistant material which forms a clear homogeneous film when stretched. Depending upon the particular use, it may be compounded further and vulcanized to yield extremely resistant and resilient vulcanizates which may be used over a wide temperature range.

Another composition is prepared by mixing 80 parts of a butadiene-1,3 acrylonitrile copolymer stock containing the following ingredients:

| | Parts |
|---|---|
| Butadiene-1,3 acrylonitrile copolymer (75% butadiene; 25% acrylonitrile) | 100 |
| Channel black | 65 |
| Dibutyl phthalate | 25 |
| Zinc oxide | 5 |
| Phenyl beta naphthylamine | 1 |
| Cottonseed fatty acids | 1.5 |
| Dimethyl mercapto thiazole | 1.5 |
| Sulfur | 1.5 | with 20 parts of a polyvinyl chloride stock made up as follows:

| | Parts |
|---|---|
| Polyvinyl chloride | 100 |
| Tricresyl phosphate | 95 |
| Lead silicate | 2 | and the composition is given a 30 min. cure at 300° F. A vulcanizate is obtained which compares favorably in tensile strength and in percent elongation with the vulcanizate obtained from the copolymer stock alone. This composition swells only 1.8% by volume when immersed in gasoline for 14 days as compared to a swelling of 12.6% by the copolymer vulcanizate and a shrinkage of 16% by the polyvinyl chloride composition. Moreover the tensile properties after immersion are superior to those of the copolymer vulcanizate. This composition is still flexible at −24.5° C. while the polyvinyl chloride composition is flexible only above −9.5° C. This composition is non-thermoplastic and may be used at relatively high temperatures. It is resistant to strong acids and alkalies and withstands the effects of oxygen and sunlight.

Other compositions similarly prepared also show the unexpected improvement in properties to be obtained by the practice of this invention. Compositions may be prepared which do not suffer appreciably by any loss in tensile properties or resilience, but which are much more resistant and which hold up well after prolonged contact with solvents or chemicals. Moreover these compositions are useful over a much wider temperature range than plasticized polyvinyl chloride compositions.

Although any desired proportions of the polyvinyl chloride and the butadiene-1,3 acrylonitrile copolymer may be mixed, I have found it desirable to employ from about 10 to 70 parts of the polyvinyl chloride to from about 30 to 90 parts of the copolymer, to get the best combination of resistance and rubber-like properties. Any of the plasticizers, softeners, fillers reenforcing pigments, age resisters, and vulcanizing ingredients which are ordinarily used in compounding rubber or synthetic rubber may be used as compounding ingredients. Natural rubber or other synthetic rubber may also be mixed with these compositions if desired.

The products of this invention may be used in many applications. They are particularly suitable for uses where both resistance to solvents and chemicals and high resilience are desired. They may be used at low temperatures or at high temperatures. These materials may be used advantageously in the manufacture of spinning roll cots, conveyor belts, gaskets and the like, in the construction of resistant tubing for oils, gas or chemicals, for lining tanks, as sheathings for electrical cables, for coating fabrics and in various other uses.

I claim:

1. A composition of matter comprising a homogeneous mixture of a polymeric material in which the predominant constituent is a vinyl halide, and a copolymer of a butadiene-1,3 hydrocarbon and an acrylic nitrile.

2. A composition of matter comprising a vulcanizate obtained from a homogeneous mixture of a polymeric material in which the predominant constituent is a vinyl halide, and a copolymer of a butadiene-1,3 hydrocarbon and an acrylic nitrile.

3. A composition comprising a butadiene-1,3 acrylontirile copolymer and gamma polyvinyl chloride.

4. A vulcanized composition comprising a butadiene-1,3 acrylonitrile copolymer and gamma polyvinyl chloride.

5. An unvulcanized composition comprising a butadiene-1,3 acrylonitrile copolymer containing from about 30 to 60% by weight of acrylonitrile, and gamma polyvinyl chloride.

6. A vulcanized composition comprising a butadiene-1,3 acrylonitrile copolymer containing from about 30 to 60% by weight of acrylonitrile, and gamma polyvinyl chloride.

7. An unvulcanized composition which includes from about 10 to 70 parts of gamma polyvinyl chloride and from about 30 to 90 parts of a butadiene-1,3 acrylonitrile copolymer.

8. A vulcanized composition which includes from about 10 to 70 parts of gamma polyvinyl chloride and from about 30 to 90 parts of a butadiene-1,3 acrylonitrile copolymer.

9. The method of making a resistant composition which comprises mixing a polymeric material in which the predominant constitutent is a vinyl halide with a copolymer of a butadiene-1,3 hydrocarbon and an acrylic nitrile whereby a homogeneous mass is obtained.

10. The method of making a resistant composition which comprises mixing gamma polyvinyl chloride with a butadiene-1,3 acrylonitrile copolymer whereby a homogeneous mass is obtained.

11. The method of making a resistant composition which comprises mixing plasticized gamma polyvinyl chloride with a butadiene-1,3 acrylonitrile copolymer stock, and vulcanizing the mixture.

12. A composition of matter comprising a butadiene-1,3 acrylonitrile copolymer, and plasticized gamma polyvinyl chloride.

DONALD E. HENDERSON.